Figure 1:
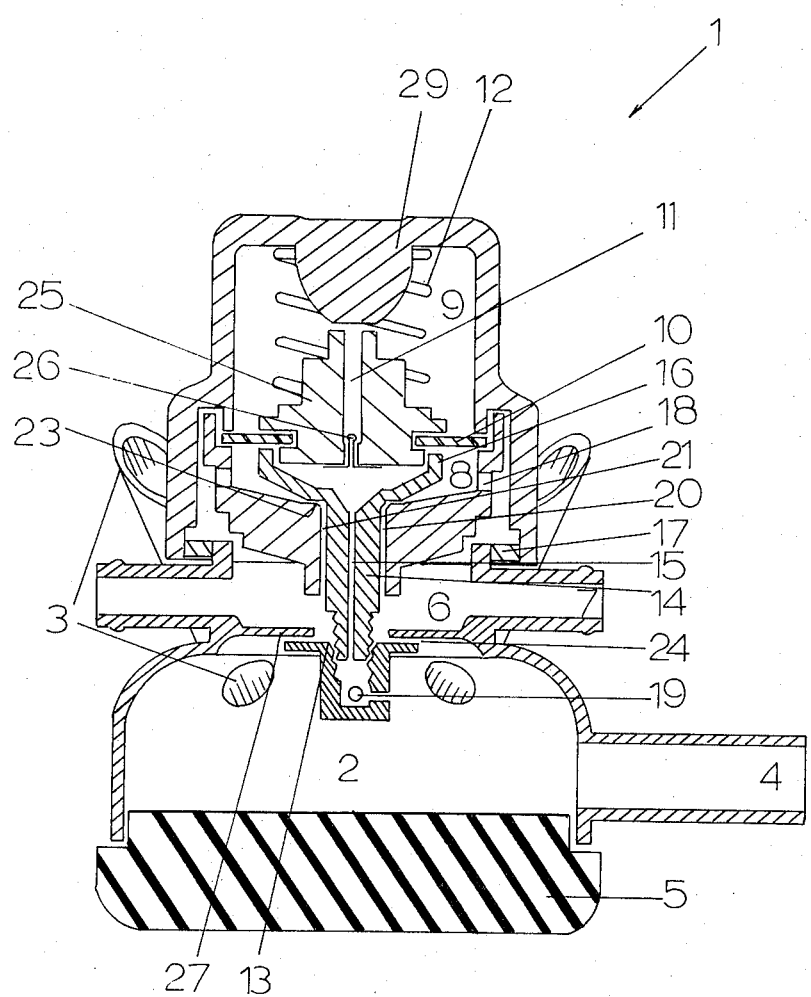

United States Patent [19]
Bodmin

[11] 3,810,443
[45] May 14, 1974

[54] PULSATOR UNITS OF MILKING MACHINES

[76] Inventor: Syd Ernest Bodmin, 39 Seaway Dr., Otumoetai, Tauranga, New Zealand

[22] Filed: June 14, 1972

[21] Appl. No.: 262,883

[30] Foreign Application Priority Data
June 17, 1971 New Zealand.................... 163990

[52] U.S. Cl. ............................................ 119/14.37
[51] Int. Cl. ............................................... A01j 5/10
[58] Field of Search............ 119/14.36, 14.37, 14.41

[56] References Cited
UNITED STATES PATENTS
2,460,426  2/1949  Maes.............................. 119/14.37

Primary Examiner—Hugh R. Chamblee
Attorney, Agent, or Firm—Ladas, Parry, Von Gehr, Goldsmith & Deschamps

[57] ABSTRACT

The pulsator unit is to be used in an installation with central evacuation and central milk storage, with only one line (for vacuum and milk) of piping. It is integral with the cluster. It operates by a driving diaphragm and a piston valve. It may apply to the outside of the inflations a pressure less than atmospheric.

1 Claim, 2 Drawing Figures

PULSATOR UNITS OF MILKING MACHINES

This invention relates to pulsator units for milking machines.

Milking machines have been designed to efficiently remove milk from the udder of a cow, by applying a vacuum to the cow's teats and operating a pulsating cycle so that pressure is intermittently applied and removed to the teats. With known types of milking machines, it is usual to apply a vacuum to the cow's teat and intermittently apply atmospheric pressure to allow the milking inflation to collapse about the teat and restore a vacuum to allow the equalization of vacuum so that the milking inflation is drawn back to allow the milk to flow. With this type of apparatus the sudden differential between a vacuum of substantially fifteen inches of mercury and atmospheric pressure causes the milking inflation to squeeze the end of the teat, momentarily stopping the flow of milk and possibly even forcing milk back into the teat and also damaging the cell structure at the end of the teat by bruising and pinching. I believe this is an important factor contributing to the spread of disease through dairy herds.

It is a principal object of the present invention to provide a pulsator for a milking machine which will obviate or substantially reduce the abovementioned disadvantage.

Also, with conventional types of milking machines, it is usual to have a master pulsator unit. This means that there must be a pulsator line travelling throughout the milking plant. This can lead to inefficiencies and require slave pulsators and also it is usual with such a construction to have a bleed aperture in the cluster to cause a flow of air to pass along the milk line. This constant introduction of air causes frothing and tends to draw contaminated air into the milk chamber which may deleteriously affect the quality of the milk.

It is therefore a further object of my invention to provide a pulsator unit for milking machines which will reduce or obviate this disadvantage.

Accordingly the invention may broadly be said to consist in pulsating means at or adjacent to the claw piece of a milking machine comprising a single unit operated from the vacuum milk line whereby the pressure in the space surrounding an inflation in each teat cup is caused cyclically to oscillate between a pressure substantially equal to that available in the milk line at the particular time and a value which approaches or equals atmospheric pressure.

In a further aspect the invention may broadly be said to consist in a pulsating means comprising:
a. A main vacuum chamber.
b. Communicating conduits from said main vacuum chamber adapted in use to be connected to the main vacuum line and the inside of the teat cup inflations.
c. A secondary chamber.
d. A port between the main vacuum chamber and the secondary chamber.
e. Communicating conduits from said secondary chamber adapted in use to be connected to the space surrounding the teat cup inflations.
f. A choked port from the atmosphere to the secondary chamber.
g. A pulsating control chamber.
h. Valve means including a differential diaphragm cyclically controlling the ports between the main chamber and the secondary chamber, and the secondary chamber and atmosphere so that the space surrouding the inflation in each teat cup is caused to oscillate cyclically between the pressure substantially equal to that in the milk line at the particular time and a value which approaches or equals atmospheric pressure.

Figure 2:
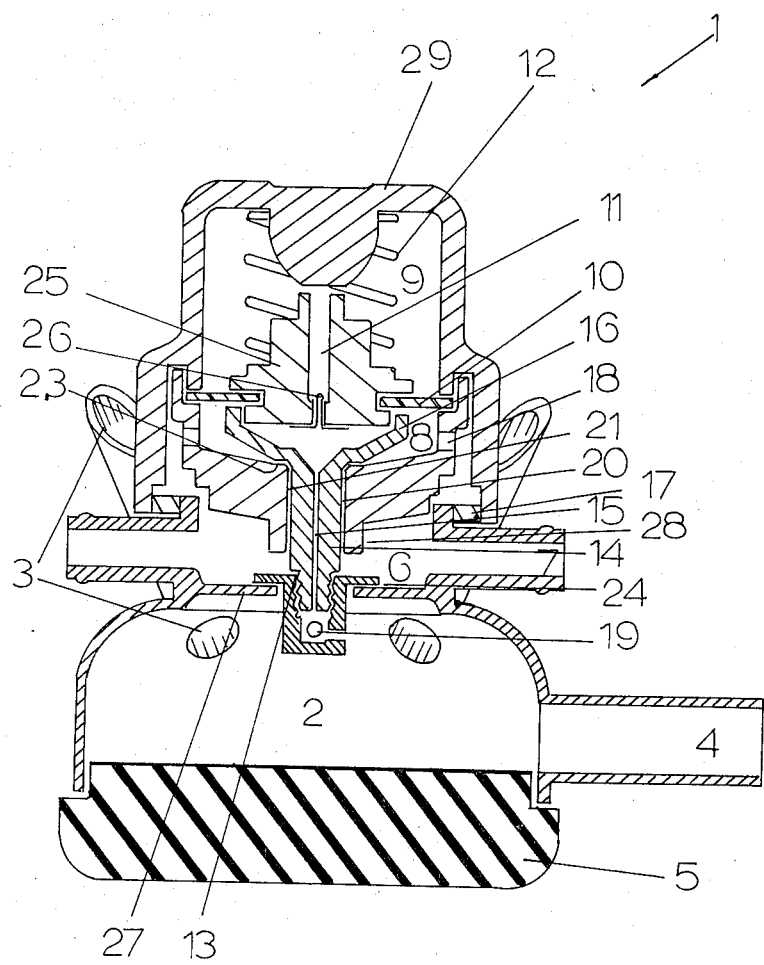

One preferred form of the invention will now be described with reference to the accompanying drawings in which:

FIGS. 1 and 2 are partially diagrammatical sectional elevations through a pulsator unit according to the present invention, in two variant forms. They differ only in that the bottom valve is in one form below, and the other form above the diaphragm which forms the valve seat.

The pulsator unit 1 has a main chamber 2 from which the milk line conduits 3 extend, and in use may be connected to the milk lines of the teat cups. The outlet 4 can be connected to the vacuum, and also provides the delivery outlet for the milk. The chamber 2 is closed by a plug 5, a friction fit, made of dairy type rubber. This plug may easily be removed for cleaning. This plug may be replaced by a sight glass.

Immediately above the chamber 2 is the pulsating chamber 6 having the pulsation conduits 7 leading therefrom. Above the pulsation chamber is an air introductory chamber 8, and above this is a control chamber 9. The control chamber has as one wall a flexible diaphragm 10 centrally mounted on which is a plastic moulding 25 pierced by a passageway 11. Passageway 11 is constricted at its bottom end to control the rate of flow of air. Blocking of the restriction is prevented by a bent piece of wire 26. A spring 12 biases the diaphragm 10 towards the position illustrated in the drawings.

A valve member 13 is screwed on a plastic moulding which has a stem 14 with an aperture 15 therethrough and a suction cup 16 at the upper end thereof.

Apertures 18 allow air continuously into the annular chamber 8. This air passes through a filter means 17.

A diaphragm 27 separates main chamber 2 from pulsating chamber 6. The two variants shown in the Figures differ in that in FIG. 1 valve 13 is below diaphragm 27, and in FIG. 2 valve 13 is above diaphragm 27. The rest position of the mechanism is with spring 12 extended, so pushing down moulding 25 and diaphragm 10. The gap between diaphragm 10 and suction cup 16 is closed, and in FIG. 1 but not in FIG. 2 the valve between suction cup 16 and valve seating 23 is closed. In FIG. 1 the valve between valve member 13 and diaphragm 27 is open, whereas in FIG. 2 this valve is closed. This difference causes a difference in mode of operation of the two variants. That corresponding with FIG. 1 will be described first.

With the valve in the position as described at the end of the preceding paragraph, conduit 4 is connected to the vacuum line. Chamber 2 is exhausted, and a vacuum is applied by way of conduits 3 to the space within the inflations in the milk cup. This supplies one of the conditions for drawing milk from the cow. The second condition is that the inflation should not squeeze the teat. With the pulsator in the condition shown in FIG. 1, this occurs since chamber 6, conduits 7 and the spaces surrounding the inflations in the milk cup are all exhausted and the inflation is in its rest position, applying no pressure to the teat.

Since the valve at 23 and the valve between suction cup 16 and diaphragm 10 are both closed, air does not pass from chamber 8 to any of chambers 2, 6 or 9. 9 is exhausted through passages 11 and 15 so that the atmospheric pressure in chamber 8 causes the diaphragm to rise and to shut off the passageway at 24. At the same time the valve at 23 opens. Air flows from chamber 8 through the constricted passageways 20 and 21 to chamber 6 and so to the outside of the inflations, causing them to collapse onto the teat. The effect on the timing of the cycle of the constriction of passages 20 and 21 is considered to be a significant improvement. Air taken from chamber 8 is replaced through filter 17 and passages 18.

Valve 13 closes before moulding 25 has reached the end of its travel. Diaphragm 10 therefore separates from suction cup 16, and air from chamber 8 passes to the inside of the suction cup where its pressure causes the suction cup to move down, closing the valve at 23 and opening valve 13. At the same time air passes up the passageway 11 into chamber 9, enabling spring 12 to return diaphragm 10 to the position shown in FIG. 1.

By the end of the cycle of operations, milk will have flowed down conduits 3 into chamber 2. When a pulse of air is next admitted to chamber 2, it will lift milk from the chamber, through conduit 4, up to the milk line.

Spring 12 may be replaced to adjust its stiffness. A three pound spring causes the time of atmosphere and of vacuum in chamber 6 to be equal. A 2 pound spring causes the vacuum to be on chamber 6 for 70 per cent of the time. Speed of pulsation, variable at will in the neighbourhood of 50 cycles per minute, is governed by the length of stroke of the suction cup, which in turn is controlled by the setting of valve 13 on its screwed stem.

The frequency of oscillation and the length of dwell at each end of the stroke of suction cup 16 are also influenced by the size of the bottom outlet from passages 11 and 15. The preferred diameter for these is in the neighbourhood of 0.025 inches.

The operation of the modification shown in FIG. 2 is as follows. In the position at rest valve 13 is closed, and so also is the valve between the lip of the suction cup 16 and the diaphragm 10. Chamber 6 is shut off from chamber 2. It is open to atmosphere via 8 and passageways 20 and 21. When chamber 2 is evacuated, air is drawn by way of passages 11 and 15 from chamber 9. Air pressure in chamber 8 lifts diaphragm 10, and since the space within suction cup 16 is evacuated, the cup goes up with the diaphragm, opening the valve at 24. Atmospheric pressure from chamber 8 and vacuum of chamber 2 are both available to chamber 6, but the opening to chamber 2 is unrestricted, whereas passages 20 and 21 are restricted. The pressure in 6 therefore falls. Quite rapidly valve 13 reaches abutment 28 and so shuts off the atmosphere from chamber 6. The outside of the inflations are evacuated by way of conduits 7. The arrest of the suction cup at the end of its stroke causes a separation from diaphragm 10 so that the atmosphere communicates from chamber 8 by way of the interior of the suction cup and passageway 11 with chamber 9. The pressure on suction cup 16 drives it down, opening the valve at 28 and closing the valve at 24, so that a pressure approaching atmospheric is applied to the outside of the inflations. The difference of pressure across diaphragm 10 is removed and spring 12 forces diaphragm 10 down, so shutting off the valve between the rim of suction cup 16 and diaphragm 10.

It has been found that with this modification of the invention a three pound spring at 12 gives equal times of suction and atmosphere on conduit 7, but that a 2 pound spring, using the outlet apertures for passages 11 and 15 previously referred to, gives a vacuum on chamber 6 for thirty per cent of the time.

The clearance at 20 and 21 controls the speed with which air is admitted to chamber 6, and so controls the highest pressure applied to the outside of the inflations. It has been found that this pressure can conveniently be 1 lb./sq.ins. below atmospheric.

What I claim is:

1. A pulsator unit for a milking machine having teat cups, comprising a. means providing a main vacuum chamber;
   b. a main vacuum line connected to said main vacuum chamber;
   c. conduits extending from said main vacuum chamber and connected to the teat cups;
   d. means providing a secondary vacuum chamber mounted above the main chamber with a wall therebetween;
   e. conduits extending from said secondary vacuum chamber and connected to the teat cups;
   f. means providing a passage from the atmosphere to said secondary vacuum chamber;
   g. means provided a pulsating control chamber mounted above said secondary vacuum chamber;
   h. means for cyclically varying the pressure applied in the teat cups from the vacuum line pressure to a pressure less than atmospheric pressure comprising valve means in said pulsating control chamber comprising a differential diaphragm urged downwardly by a spring pressed member, a freely movable pision below the diaphragm forming a choke in said passage from the atmosphere to having an upper suction cup adapted to contact the diaphragm and a lower portion extending through a port in the wall between the main and secondary chambers to open or close said port, said piston being movable from a first portion with the choked passage to atmosphere closed and the port between the main and secondary chambers open, to a second position with the choked passage to atmosphere open and the port between the main and secondary chambers closed, and including an aperture through said free piston from the main vacuum chamber to said suction cup, an aperture through said spring pressed member to the pulsating control chamber.

* * * * *